United States Patent [19]
Jordan et al.

[11] Patent Number: 4,925,467
[45] Date of Patent: May 15, 1990

[54] SELF EMPTYING VACUUM VESSEL

[76] Inventors: Roland H. Jordan; Mark R. Jordan, both of 1021 Ave. C, Redondo Beach, Calif. 90277

[21] Appl. No.: 248,621

[22] Filed: Sep. 26, 1988

Related U.S. Application Data

[63] Continuation-in-part of Ser. No. 67,981, Jun. 9, 1987, abandoned.

[51] Int. Cl.⁵ .............................................. B01D 50/00
[52] U.S. Cl. ........................................ 55/430; 15/347; 55/432
[58] Field of Search ................... 15/347, 352; 55/428, 55/430, 432

[56] References Cited

U.S. PATENT DOCUMENTS

| | | | |
|---|---|---|---|
| 2,098,024 | 11/1937 | Bailey | 55/430 X |
| 2,805,732 | 9/1957 | Martinez | 55/430 X |
| 3,362,140 | 1/1968 | Mott | 55/430 X |
| 3,486,309 | 12/1969 | Wild | 15/352 X |
| 3,887,343 | 6/1975 | Margraf | 55/430 X |
| 3,909,222 | 9/1975 | Caughlin et al. | 55/430 X |

*Primary Examiner*—Chris K. Moore

[57] ABSTRACT

The Self Emptying Vacuum Vessel is an apparatus for collecting and discharging solid and or liquid material. The system is used to transfer said material from an undesirable area to a more preferred location. The Self Emptying Vacuum Vessel comprises a containment vessel which collects said material by a vacuum means and a screw conveyor as a means for continuously expelling said material from said vessel. Continuous flow is insured into said vessel by a vacuum regulating means and out of same vessel by an anti-bridging means.

6 Claims, 2 Drawing Sheets

SELF EMPTYING VACUUM VESSEL

This is a continuation-in-part of application Ser. No. 67,981, filed June 9, 1987, and now abandoned.

BACKGROUND OF THE INVENTION

The present invention was initially targeted, but not limited, to the process of cleaning oil refinery storage tanks. Typically, there is a heavy sediment which must be removed from the bottom of the tanks during the cleaning process. The sediment is unusable hazardous waste which must be disposed of at an appropriate dump site. The sediment can further be described as a highly viscous hydrocarbon containing notable levels of scale and sand.

The present method for removing such sediment requires the addition of a light hydrocarbon, such as diesel, to lower the viscosity level, then picking up the treated sediment with a vacuum truck. The additive is necessary because the vacuum truck cannot produce enough suction to pick up highly viscous sediment. Sediment volume increases approximately twenty percent as a result of the additive process. The hydrocarbon additive is then transported along with the sediment to either be extracted from the sediment at an additional cost or disposed of with the hazardous waste.

Another method of interest for removing tank sediment is the use of a high strength industrial vacuum. This method does not require the light-hydrocarbon additive, discussed in the previous method, because the suction produced from these vacuums is adequate for picking up highly viscous tank sediment. High strength vacuums are not currently used for tank cleaning because the collection container for these vacuums can only hold a few cubic yards of sediment. When the container is full, the cleaning process is halted, the unit is moved to a dump site and emptied. The lost time of constantly emptying the container excludes this as a feasable method for cleaning tanks.

To overcome the shortcomings of the above methods, the present invention is developed to reduce the volume of hazardous waste and provide a more efficient cleaning system. The present invention collects the sediment by a means similar to that of the industrial high strength vacuum. Yet the present invention is able to expell waste from the collection container on a continuous basis, thus alleviating the need to continuously stop and empty a full container. No additive is needed with the present invention because adequate suction can be maintained to pick up the sediment in an untreated state.

The reference to "sediment" and "hazardous waste" above are used only to reveal the initial applications and is not intended to be limiting. In fact, the prototype model of this invention was tested using several materials, such as sawdust, sand, water and mud to name a few.

SUMMARY OF THE INVENTION

The present invention is a system for collecting granular solids and or liquids from any surface while discharging this material into storage.

Another object of the invention is to reduce the volume of hazardous waste generated by other cleaning methods.

Still another object of the invention is to provide an efficient means for cleaning confined areas by connecting a collection tube to the present invention.

Another object of the invention is to provide an automatic dumping feature for present and future vacuum systems.

Another object of the invention is to provide a rapid removal of material thereby reducing labor costs and exposure time when dealing with hazardous waste.

BRIEF DESCRIPTION OF THE DRAWINGS

Other objects and advantages of the invention will become more apparent from the specification taken in conjunction with the accompanying drawings, in which.

DETAILED DESCRIPTION OF THE INVENTION

Figure 1:
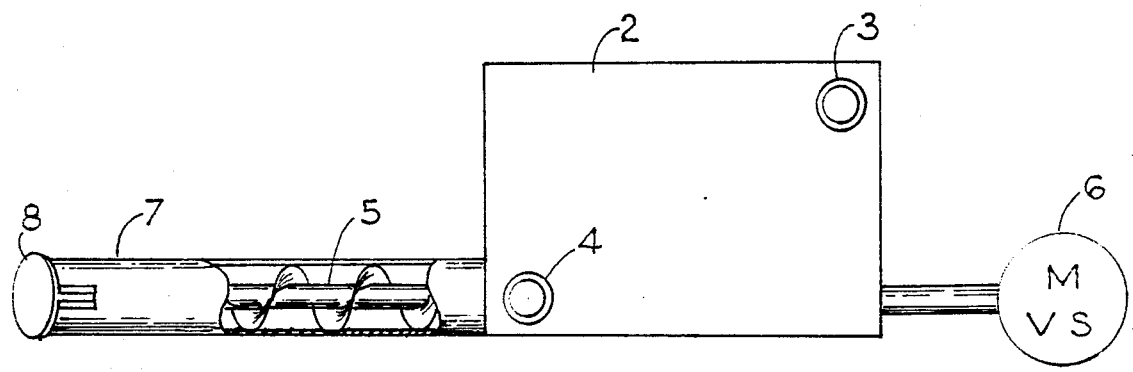
FIG. 1 is a plan view, with cut-away, of the Self Emptying Vacuum Vessel.
Figure 2:
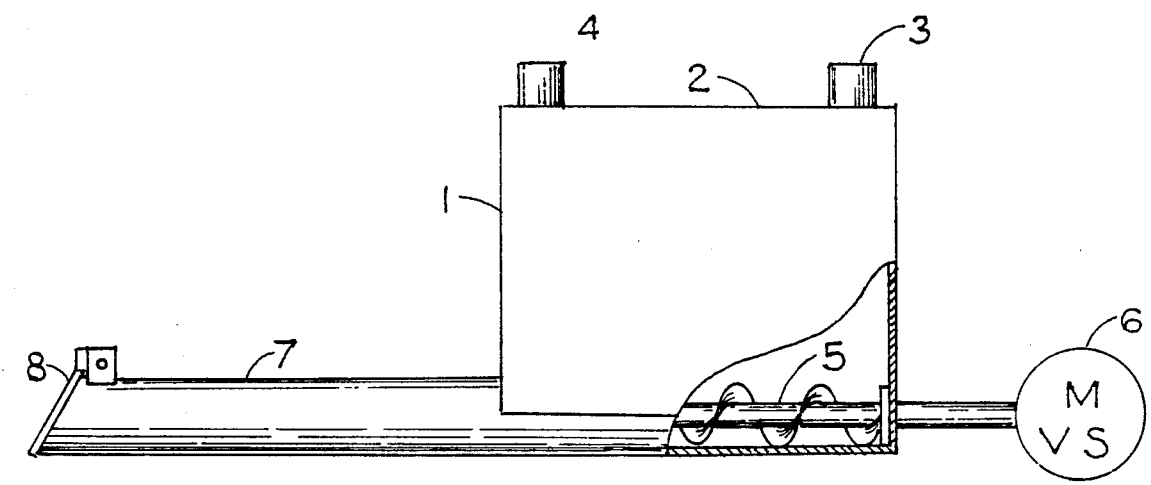
FIG. 2 is a front view, with cut-away, of the Self Emptying Vacuum Vessel.
Figure 3:
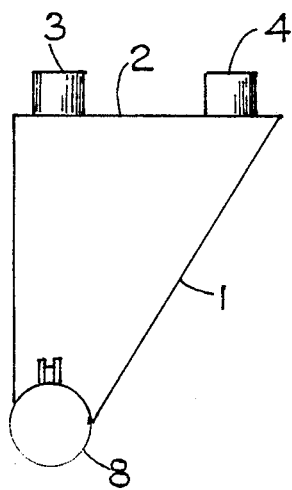
FIG. 3 is a left side elevation view of the Self Emptying Vacuum Vessel.
Figure 4:
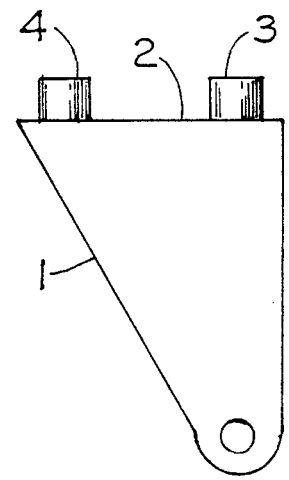
FIG. 4 is a right side elevation view of the Self Emptying Vacuum Vessel.

Referring to the drawing shown in FIG. 1, numeral 1 designates a vessel suitable for vacuum, having a removable top 2, a baffle and outlet conduit as a means for connecting to a suction source 3, and a connecting means for a material intake suction hose 4. A screw conveyor 5, rotated by a mechanical means consisting of a motor 6 and bearings at both ends of the conveyor shaft, with an outflow conduit 7 and a vacuum regulator 8. Numeral 9 is the anti-bridging mechanism.

A suction means connected to 3, creates a vacuum inside vessel 1, allowing material to be collected through intake 4 with the aid of an extension tube if necessary.

Materials collected into the vessel drop to screw conveyor 5 by gravity. Some materials tend to adhere to the walls of the vessel, creating a material gap above the screw conveyor. Such a gap can disrupt the feed to the screw conveyor. For this reason, an anti-bridging means 9 is provided to break down these gap formations.

Material fed to the screw conveyor is carried from the vessel through conduit 7 and expelled through the vacuum regulator 8. The regulator is a cover plate hinged at the top and seats about 5 degrees off vertical when closed. An initial seal is required to arrest air comming in from conduit 7 until the screw conveyor can pack enough material into conduit 7 to create a material seal. The high air flow of the vacuum makes it impossible for the conveyor to establish a material seal without the aid of vacuum regulator 8. Once the material seal is established, the conveyor forces material, opening vacuum regulator 8. When there is not enough material for a seal, the vacuum regulator reseats, a new material seal is established, etc.

Figure 5A:
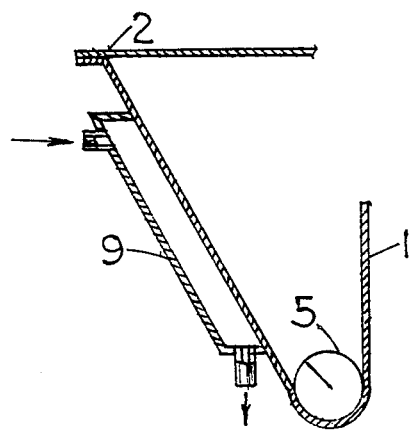
FIG. 5A shows a steam based anti-bridging mechanism.
Figure 5B:
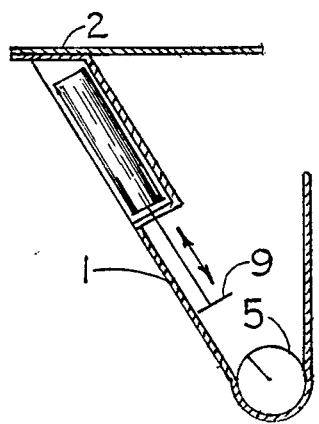
FIG. 5B shows a scrape type anti-bridging mechanism.
Figure 5C:
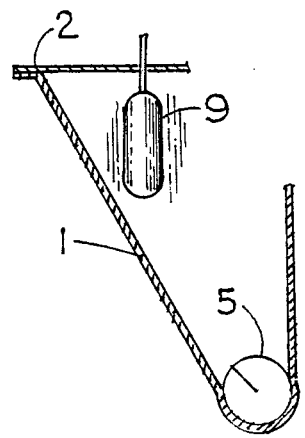
FIG. 5C is a vibrating anti-bridging mechanism.

Bridging can be prevented by keeping collected material from clinging to the side walls of vessel 1, especially the slanted wall because it is non-vertical. We have found that the anti-bridging mechanism 9 placed on or near the slanted wall is most effective in preventing bridges from forming above screw conveyor 5. An anti-bridging device is any heat, scraping or vibrating means which keeps collected material from adhering to the side walls. A heating means, like the steam jacket shown in 5A, an electric coil, or an open flame, liquifies semi-solid material with a low melting point by heating the side wall. FIG. 5B shows a scraping means; a horizontal paddle spanning the slanted wall, activated by a double action piston which is effective at preventing gaps in most sludges. A vibrating means, suspended from the lid as in FIG. 5C, or attached to the slanted wall keeps many liquid based slurries from bridging. Choosing an anti-bridging device depends on the availability of resources and the physical properties of the application material.

The disclosure of the invention described herein above represents the preferred embodiments of the invention; however, variations thereof, in the form, construction, and arrangement of the various components thereof and the modified application of the invention are possible without departing from the spirit and scope of the appended claims.

What is claimed is:

1. Self emptying vacuum vessel comprising:
   a chamber suitable for containing a vacuum therein having a removable top with an inlet connection for receiving wet or dry material;
   said top having a first outlet connection to a vacuum source;
   said chamber having three vertical and one slanted side walls;
   a trough extending longitudinally along and connected to the lower end of said side walls;
   a screw conveyor mounted, with bearings, in said trough having a second outlet at one end for disposing of said material from said chamber;
   said slanted wall having an antibridging means for maintaining flow of said material to said screw conveyor, by preventing collected material within the vessel from adhering to said slanted wall,
   said second outlet having a cover, hinged at the top, as a means for allowing said material out of said second outlet when said cover is open and prevents air from coming in said second outlet when said cover is closed.

2. A self emptying vacuum vessel described in claim 1 wherein said first outlet provides a baffle as a means for allowing only clean air to pass through said first outlet.

3. A self emptying vacuum vessel described in claim 1 wherein said screw conveyor provides a motor for rotating said conveyor.

4. A self emptying vacuum vessel described in claim 1 wherein said antibridging means consists of a heating means for heating said slanted wall.

5. A self emptying vacuum vessel described in claim 1 whererein said antibridging means consists of a scraping means for scraping said slanted wall.

6. A self emptying vacuum vessel described in claim 1 wherein said antibridging means consists of a vibrating means for vibrating the material within said vessel.

* * * * *